(12) United States Patent
Flynn et al.

(10) Patent No.: US 7,908,188 B2
(45) Date of Patent: Mar. 15, 2011

(54) METHOD AND SYSTEM OF MANAGING ACCOUNTS PAYABLE AUDITING DATA

(75) Inventors: Joseph A. Flynn, San Jose, CA (US); Wassim G. Jraige, Cupertino, CA (US)

(73) Assignee: Lavante, Inc., San Jose, CA (US)

(*) Notice: Subject to any disclaimer, the term of this patent is extended or adjusted under 35 U.S.C. 154(b) by 2443 days.

(21) Appl. No.: 10/349,727

(22) Filed: Jan. 22, 2003

(65) Prior Publication Data
US 2003/0149645 A1 Aug. 7, 2003

Related U.S. Application Data

(60) Provisional application No. 60/350,543, filed on Jan. 22, 2002.

(51) Int. Cl.
*G07B 17/00* (2006.01)
(52) U.S. Cl. .............. 705/30; 705/38; 705/39
(58) Field of Classification Search .......... 705/39, 705/30, 38, 64
See application file for complete search history.

(56) References Cited

U.S. PATENT DOCUMENTS

| | | | | |
|---|---|---|---|---|
| 5,210,687 A * | 5/1993 | Wolfberg et al. | ........... | 705/36 R |
| 6,434,534 B1 * | 8/2002 | Walker et al. | ............ | 705/14 |
| 6,643,625 B1 * | 11/2003 | Acosta et al. | ............ | 705/38 |
| 6,687,677 B1 * | 2/2004 | Barnard et al. | ............ | 705/7 |
| 6,847,942 B1 * | 1/2005 | Land et al. | ............ | 705/30 |
| 2001/0011245 A1 * | 8/2001 | Duhon | ............ | 705/38 |
| 2003/0110136 A1 * | 6/2003 | Wells et al. | ............ | 705/64 |

OTHER PUBLICATIONS

Firms accrue lost dollars to chains' bottom line by Isabelle Sender. Chain Store Age. New York: Oct. 1997. vol. 73, Iss.10; p. 196, 2pgs.*
Delayed payments raise. Cash without offending vendors by Jaffe, Robert. Corporate Cashflow. Atlanta: Jun. 1995. vol. 16, Iss. 6; p. 24, 3 pgs.*
Payment systems that work by Kathryn J. White, Mary McKenney. TMA Journal. Atlanta: Mar./Apr. 1998. vol. 18, Iss.2; p. 32, 4 pgs.*
Brochure, "Auditing Solutions, Protecting Your Interests," 1999, pp. 1-8.
http://web/archive.org/web/200110001105042/http://theaudit.com/..., 2001, pp. 1-7.

* cited by examiner

*Primary Examiner* — Vanel Frenel
(74) *Attorney, Agent, or Firm* — Michael A. Glenn; Glenn Patent Group

(57) ABSTRACT

The present invention provides a method and system of managing accounts payable auditing data, where the auditing data includes at least one line item and is ordered by a propensity to yield claims. The method and system, in an exemplary embodiment, includes (1) displaying at least one aged line item, (2) identifying credit data among the at least one displayed aged line item, and (3) recording the identified credit data. In an exemplary embodiment, the aged line item is a line item that has aged for N months, where N is positive integer. In an exemplary embodiment, N is 4.

30 Claims, 16 Drawing Sheets

FIG. 5B

Claims Summary

| Audit | Statement Status | Spoke To | Line Item | Credit Date | Amount | Reference | Type | Claim Date | Claim Status | Batch | Batch Date |
|---|---|---|---|---|---|---|---|---|---|---|---|
| A | 11/07/02 | Credits | BK002006 | 06/13/02 | $52.72 | 464657 | Duplicate | 12/20/2002 1:39:53 PM | | BK002 | 12/20/2002 1:39:53 PM |
| B | 11/07/02 | Credits | BK002007 | 07/05/02 | $219.00 | 470497 | Misc | 12/20/2002 1:39:53 PM | | BK002 | 12/20/2002 1:39:53 PM |
| C | 11/07/02 | Credits | BK002008 | 06/10/02 | $2,254.00 | 463231 | Duplicate | 12/20/2002 1:39:53 PM | | BK002 | 12/20/2002 1:39:53 PM |

| Credits:Summary | | | | | | | |
|---|---|---|---|---|---|---|---|
| Audit | Statement | Status | Credit Date | Month Due | Amount | Reference | Type |
| A | 11/07/02 | Credits | 09/09/02 | Jan | $252.94 | 484984 | |
| B | 11/07/02 | Credits | 09/16/02 | Jan | $233.24 | 486223 | |
| C | 11/07/02 | Credits | 09/06/02 | Jan | $85.45 | 1009 | |
| D | 11/07/02 | Credits | 10/15/02 | Feb | $85.45 | 492455 | |
| E | 11/07/02 | Credits | 10/21/02 | Feb | $6,638.86 | 10026846 | |

Friday, December 06, 2002

Attention: Wes Jraige

Subject: Batch AC001 dated 12/06/02
Line items AC001001 to AC001001
Covering 1 claim(s) from 12/06/02 to 12/06/02
$74.38 in credits
No refunds
No voids
$74.38 net AC001 Batch Details:

Credits:

| Vendor | Line Item | Reference | Date | Location | Amount |
|---|---|---|---|---|---|
| | AC001001 | 445209 | 03/25/2002 | Mid West | $74.38 |
| Vendor Credits Total $74.38 | | | | | |

[690 — Claim Search interface screenshot with annotations]

- 660 — CLAIM SEARCH CL004
- 691 — Batch Summary: Batch CL004, Date 1/3/2003 2:37:35 PM, Period 01/03/03-01/03/03, Line Items CL004001-CL004003, Claims 3, $34,644.68, Refund 0, Void 0, Hold 0, Total 3, $34,644.68
- 692 — Line Item details
  - 693 — Vendor
  - 694 — Line Item: CL004001
  - 695 — Reference: JPD-1571489001
  - 696 — Date: 05/31/2002
  - 697 — Amount: $570.68
  - Location: 1001
  - Status
  - Comment
- 698 — (footer button)
- 699 — Alt+s to save [Save]

FIG. 7B

| Claim Search Results | Y records shown, more may exist | | | | | |
|---|---|---|---|---|---|---|
| Batch/Line Item | Vendor Number | Vendor ID | Reference | Batch Date | Amount | Claim Send Date |
| CL001/CL001002 | 62988 | 70887 | JPD-008734-0 | 12/13/2002 12:07:09 PM | $1,200.00 | 12/13/2002 12:07:09 PM |
| CL001/CL001005 | 9401 | 68076 | JPD-99UNAPPL | 12/13/2002 12:07:09 PM | $297.83 | 12/13/2002 12:07:09 PM |

Vendors  Credits/Claims  Client Interface  Logout

Client Interface

Preview

| | Invoice | |
|---|---|---|
| Date | Friday, December 06, 2002 | Bill to |
| Invoice Number | AC10001 | |
| Covering Batches | AC001 - AC006 | Attention: |

| | |
|---|---|
| Findings for the period | $144,124.06 |
| Less | |
| Refunds for the period | $0.00 |
| Voids for the period | $0.00 |
| Net findings for the period | $144,124.06 |
| Maximum billable per line item | $5,000.00 |
| Billable Amount | $97,522.09 |
| Rate | Below $100,000.00: 5% |
| | Between $100,000.00 and $500,000.00: 3% |
| | Between $500,000.00 and $1,500,000.00: 2% |
| | Between $1,500,000.00 and $5,000,000.00: 1% |
| | Between $5,000,000.00 and $100,000,000.00: 1% |
| Amount due this invoice | $4,876.10 |

FIG. 8

METHOD AND SYSTEM OF MANAGING ACCOUNTS PAYABLE AUDITING DATA

RELATED APPLICATIONS

The present invention claims priority to U.S. Provisional Patent Application No. 60/350,543, filed Jan. 22, 2002. The contents of U.S. Provisional Patent Application No. 60/350,543, filed Jan. 22, 2002, are hereby incorporated by reference.

FIELD OF THE INVENTION

The present invention relates to auditing software. More particularly, the invention relates to a method and system of managing accounts payable auditing data.

BACKGROUND OF THE INVENTION

The practice of performing recovery audits originated in the early 1970's, during a time of increased commerce for the retail industry. A growing network of national chain stores led to a rise in competition for retail shelf space from different suppliers. Large companies had a difficult time keeping track of the many different vendor price points, rebates, and other various discounts.

Keeping track of such details was not an integral part of purchasing departments. Such oversights led to a substantial amount of lost revenue going unnoticed in the form of duplicate payments, overpayments, missed shipments, unused credits, and other transactional errors between a company and its suppliers.

Accounts Payable Audit

Today, in a typical accounts payable (A/P) audit, auditors work with the A/P records of a company in an attempt to find potentially profitable discrepancies in a vendor transaction file for the company or individual business units of the company. Although much of an A/P audit can be performed at a third party location, the A/P audit generally requires the cooperation and time of individuals within the client-organization to work in conjunction with the auditors. The A/P audit is a useful tool but can be time consuming for the client. However, typical A/P auditing firms are unable to do a thorough job of reviewing vendor data.

Statement Audit

Another type of audit emerging within the auditing industry is a statement audit (SA). A SA is initiated from the vendors' records and, thus, requires little, if any, intrusion within the client-company. Once vendor files are secured, the auditing company begins the process of searching for gaps, differences, and discrepancies that result in the client-company losing revenue. FIG. 1 shows a prior art statement audit method that includes a step 110 of recording contact information of a vendor, a step 120 of reviewing only open line items corresponding to the vendor, a step 130 of identifying claims among the open line items, a step 140 of validating the identified claims, a step 150 of storing the validated claims, and a step 160 of invoicing the stored validated claims. Recording contact information of a vendor 110 is typically done manually by a person.

A SA deals directly with suppliers and vendors. However, if performed properly, a SA yields findings that an A/P audit could miss. Because of the unique nature of a SA, the SA can either stand alone or function alongside typical A/P recovery efforts. A SA is very labor intensive because the SA audit requires the requesting, receiving, organizing, and following up with vendors on auditing data from many sources. In some statement audits, the number of sources ranges in the tens of thousands of sources. Due to the labor intensive demands of a SA, very few A/P auditing firms in the A/P auditing industry, if any, have the capability of doing a thorough and complete job for their clients.

Prior art statement audits fail to manage credits based on line item data or on a line item basis. Instead, prior art statement audits attempt to manage credits based only on statement level data, which is not as detailed as line item data. Prior art statement audits typically only deal with open line items. Prior art statement audits put each open line item in a file and then record a note for each open line item indicating that the open line item should be checked at some point in the future. In addition, prior art statement audits only keep track of claims. Prior art statement audits fail to keep track of every line item of a client.

Transactional Errors

There is no accepted way to predict the success of an audit. However, a general rule of thumb is that transactional errors occur with a frequency of about $\frac{1}{10}$ of 1%. That translates to a million dollars of annual recovery for every billion dollars of a company's annual revenue.

The A/P auditing industry is growing in size and stature as third party A/P auditing firms attempt to recover lost profits for their clients. However, since A/P auditing firms are unable to do a thorough job of reviewing vendor data, clients have employed internal auditors in order to recover lost profits via a statement audit. However, clients typically are unable to perform statement audits because they do not have the amount of staff necessary to perform a statement audit. Therefore, a method and system of managing accounts payable auditing data is needed.

SUMMARY OF THE INVENTION

The present invention provides a method and system of managing accounts payable auditing data, where the auditing data includes at least one line item and is ordered by a propensity to yield claims. The method and system, in an exemplary embodiment, includes (1) displaying at least one aged line item, (2) identifying credit data among the at least one displayed aged line item, and (3) recording the identified credit data. In an exemplary embodiment, the aged line item is a line item that has aged for N months, where N is positive integer. In an exemplary embodiment, N is 4.

In an exemplary embodiment, the displaying includes (a) prompting if there are any line items that are aged line items that have to be validated and deducted, (b) displaying the number of vendors, by rank, that have and have not responded and a status assigned to those vendors, and (c) allowing for the noting and aging for follow up of when the vendor promises a fax, a callback, a mailing of an item, or a check request and when a client puts a claim on hold.

In an exemplary embodiment, the recording includes (a) allowing for the entry of contact data for at least one vendor, (b) allowing for entry of information about a vendor statement associated with the vendor, (c) allowing for selection of information about credits/claims, credits, or claims of the vendor, (d) allowing for the interaction with the information about the credits/claims, the credits, or the clams of the vendor, and (e) allowing for the entry of comments about the recording.

THE FIGURES

FIG. 5B is a diagram of a credits/claims area in accordance with an exemplary embodiment of the present invention.

FIG. 5C is a diagram of a claims summary area in accordance with an exemplary embodiment of the present invention.

FIG. 5D is a diagram of a credits summary area in accordance with an exemplary embodiment of the present invention.

FIG. 5E is a diagram of a credits/claims data area in accordance with an exemplary embodiment of the present invention.

FIG. 6B is a diagram of a batch preview screen in accordance with an exemplary embodiment of the present invention.

FIG. 6C is a diagram of a batch screen in accordance with an exemplary embodiment of the present invention.

FIG. 7B is a diagram of a claims search results screen in accordance with an exemplary embodiment of the present invention.

FIG. 8 is a diagram of an invoice preview screen in accordance with an exemplary embodiment of the present invention.

DETAILED DESCRIPTION OF THE INVENTION

The present invention provides a method and system of managing accounts payable auditing data, where the auditing data includes at least one line item and is ordered by a propensity to yield claims. In an exemplary embodiment, as shown in FIG. 2, the present invention includes a step 210 of displaying at least one aged line item, a step 220 of identifying credit data among the at least one displayed aged line item, and a step 230 of recording the identified credit data.

Figure 1:
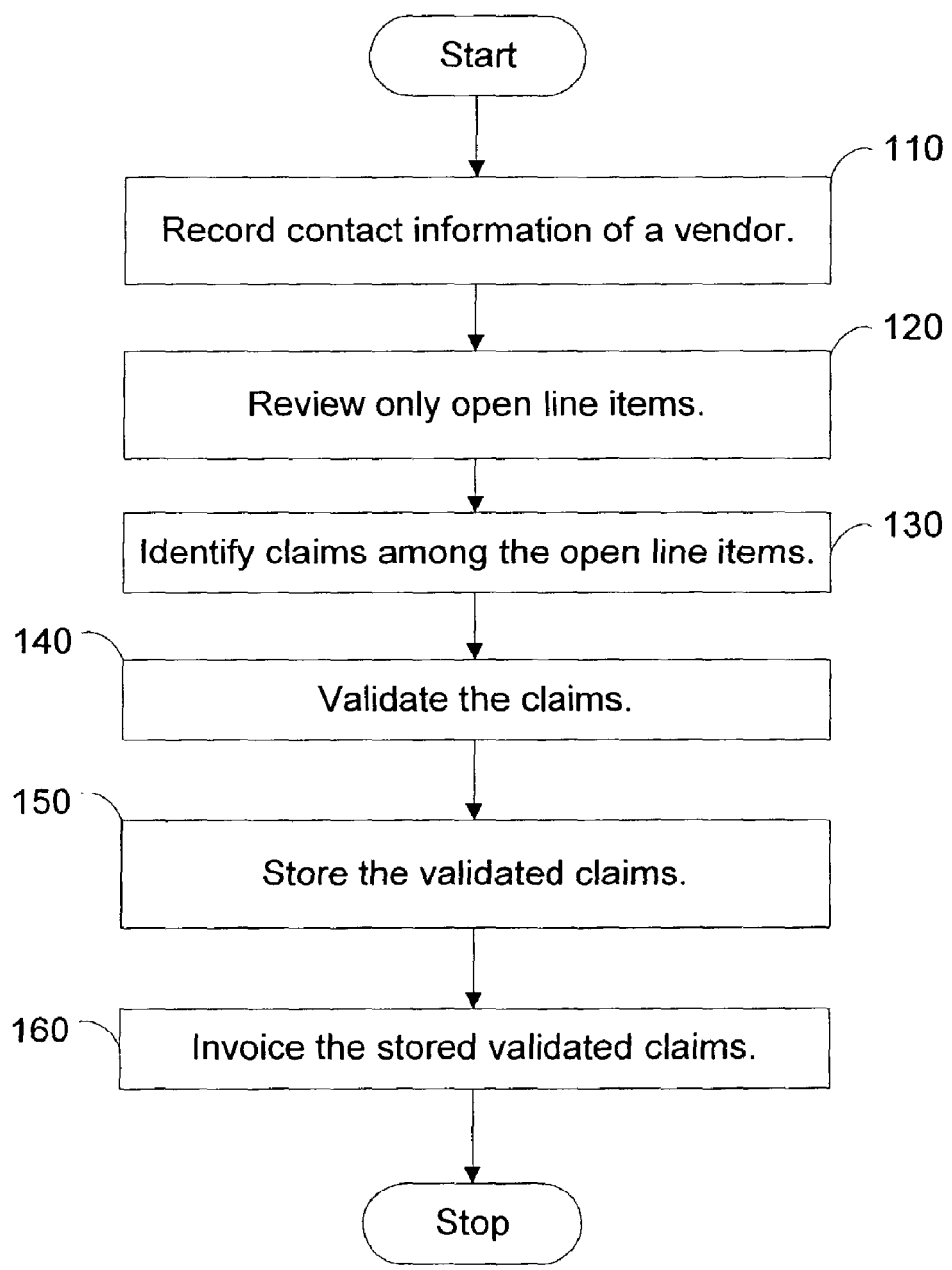
FIG. 1 is a diagram of a prior art statement audit method.
Figure 2:
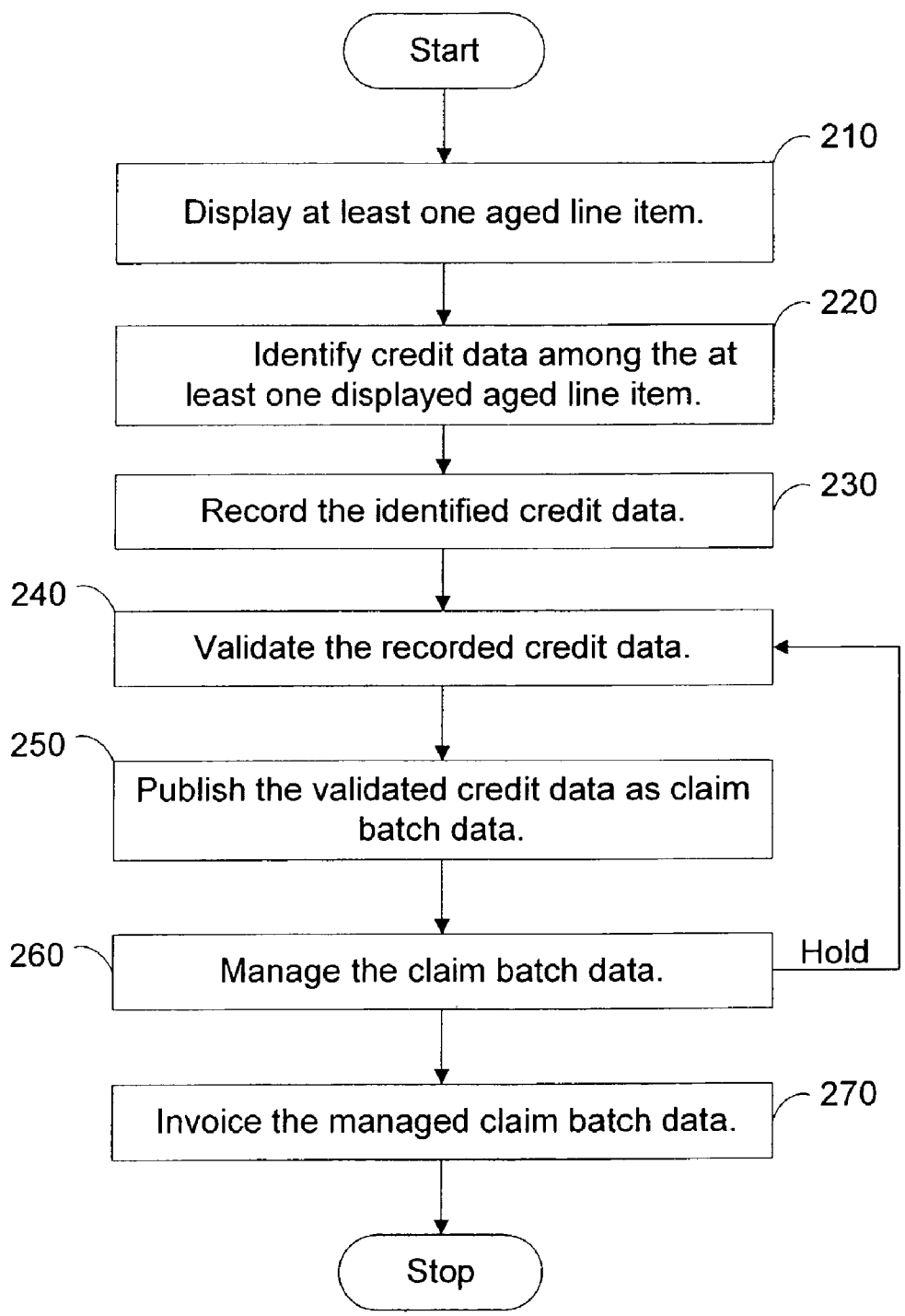
FIG. 2 is a flowchart in accordance with an exemplary embodiment of the present invention.

In an exemplary embodiment, as shown in FIG. 2, the present invention further includes a step 240 of validating the recorded credit data. In an exemplary embodiment, the present invention further includes a step 250 of publishing the validated credit data as claim batch data. In an exemplary embodiment, the present invention further includes a step 260 of managing the claim batch data. In an exemplary embodiment, the present invention further includes a step 270 of invoicing the managed claim batch data.

Auditing Data

In an exemplary embodiment, the auditing data includes at least one request from at least one vendor. In an exemplary embodiment, the auditing data includes a vendor statement corresponding to a vendor. In an exemplary embodiment, the vendor statement includes a received facsimile. In an exemplary embodiment, the received facsimile is stored in a computer data file associated with a vendor record corresponding to the vendor. In an exemplary embodiment, vendor data is auditing data corresponding to at least one vendor.

Displaying Aged Line Items

In an exemplary embodiment, the at least one line item includes at least one potential credit. In an exemplary embodiment, an aged line item is a line item that has aged for N months, where N is positive integer. In step 210, the present invention displays at least one line item when it is an aged line item. In an exemplary embodiment, N is 4.

Auditor Screen

Figure 3A:
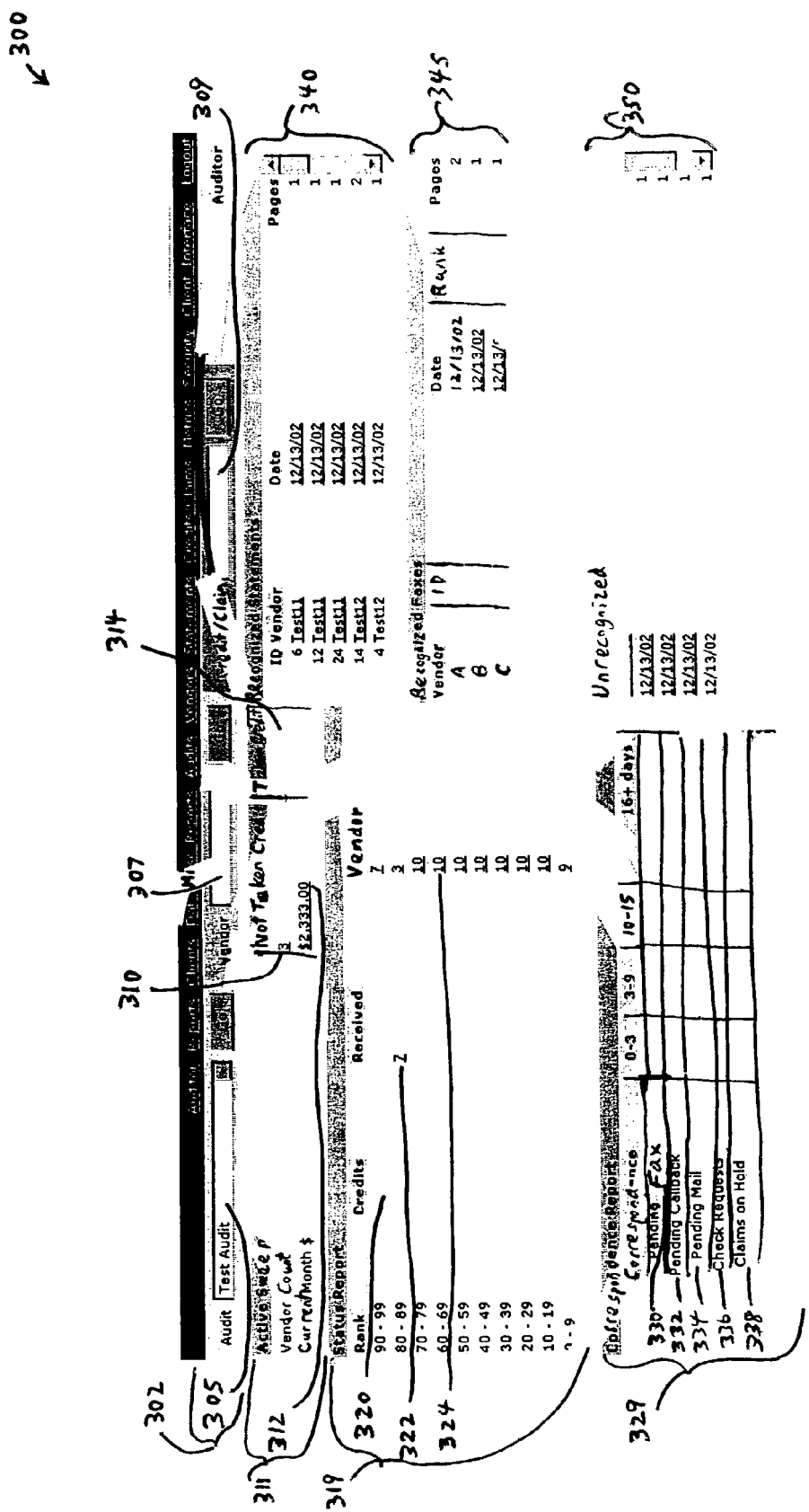
FIG. 3A is a diagram of an auditor screen in accordance with an exemplary embodiment of the present invention.

In an exemplary embodiment, in step 210, the present invention displays at least one aged line item via an auditor screen 300, as shown in FIG. 3A. In an exemplary embodiment, auditor screen 300 includes a selection area 302, an active sweep area 311, a status report area 319, a correspondence report area 329, a recognized statements area 340, a recognized faxes area 345, and an unrecognized area 350. In an exemplary embodiment, an auditor can work on the statement audit by using auditor screen 300. Thus, the auditor is not overwhelmed by the totality and size of the statement audit. The auditor can focus on auditor screen 300 and perform the statement audit by beginning work with auditor screen 300. In an exemplary embodiment, auditor screen 300 schedules an audit of the at least one aged line item via selection area 302, active sweep area 311, status report area 319, correspondence report area 329, recognized statements area 340, recognized faxes area 345, and unrecognized area 350.

Selection Area

In an exemplary embodiment, selection area 302 includes an audit select area 305, a vendor select area 307, and a credit/claim select area 309. Audit select area 305 allows for the selection of a statement audit to be worked on. Credit/claim select area 309 allows for the selection of credits/claims to be searched.

Figure 4:
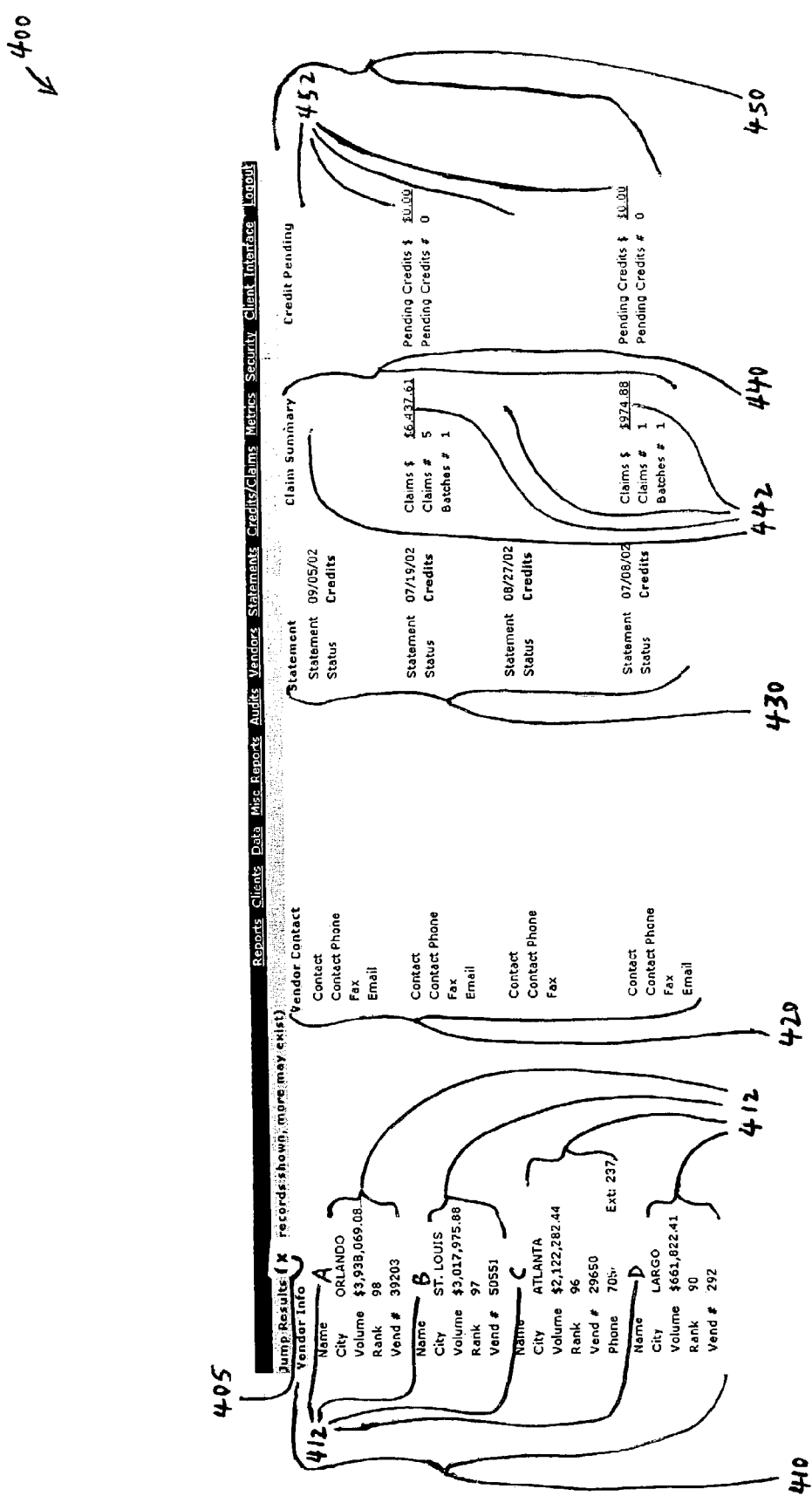
FIG. 4 is a diagram of a vendor search results screen in accordance with an exemplary embodiment of the present invention.

Vendor select area 307 allows for the selection of a vendor for the audit. Vendor select area 307 allows for the searching of vendor. Vendor select area 307 allows for the inputting of a character string of a vendor, a vendor name, a vendor number, or a vendor identification code in order to initiate a search for vendor data. In an exemplary embodiment, a search for vendor data via vendor select area 307 causes a vendor search results screen 400 to be displayed, as shown in FIG. 4.

Active Sweep Area

In an exemplary embodiment, active sweep area 311 includes a not taken credit against vendor count area 310, an aging credits current month dollar amount area 312, and a taken credit against vendor count area 314. In an exemplary embodiment, aging credits current month dollar amount area 312 prompts the auditor if there are any line items that have recently come of age that have to be verified and deducted.

In an exemplary embodiment, not taken credit against vendor count area 310 displays the number of vendors against whom credits have not been taken and whose vendor statements have aged for N months. In an exemplary embodiment, aging credits current month dollar amount area 312 displays the current month dollar amount for credits that have aged for N months. In an exemplary embodiment, taken credit against vendor count area 314 displays the number of vendors against whom credits have been taken and whose vendor statements have aged for N months.

Status Report Area

In an exemplary embodiment, status report area 319 includes a credits area 320, a received area 322, and a vendor area 324. Status report area 319 displays the number of vendors, by rank, that have and have not responded and the status of those vendors.

In an exemplary embodiment, credits area 320 displays the number of vendors, by rank, against whom credits have been taken. In an exemplary embodiment, received area 322 displays the number of vendors, by rank, whose vendor statements have been received. In an exemplary embodiment, vendor area 324 displays the number of vendors, by rank, whose vendor statements have not been received.

Correspondence Report Area

In an exemplary embodiment, correspondence report area 329 includes a pending fax row area 330, a pending callback row area 332, a pending mail row area 334, a check requests row area 336, and a claims on hold row area 338. Correspondence report area 329 allows for the noting and aging for follow up of (1) when a vendor promises a fax, a callback, a mailing of an item, or a check request and (2) when a client puts a claim on hold.

In an exemplary embodiment, pending fax row area 330 allows for the noting and aging for follow up of when a vendor promises a fax. In an exemplary embodiment, pending callback row area 332 allows for the noting and aging for follow up of when a vendor promises a callback. In an exemplary embodiment, pending callback row area 332 also allows for the noting and aging for follow up of when a message is left with a vendor. In an exemplary embodiment, pending mail row area 334 allows for the noting and aging for follow up of when a vendor promises a mailing of an item. In an exemplary embodiment, check requests row area 336 allows for the noting and aging for follow up of when a vendor promises a check.

In an exemplary embodiment, claims on hold row area 338 allows for the noting and aging for follow up of when a client puts a claim on hold. Via claims on hold row 338, claims on hold are made a priority.

In addition, in an exemplary embodiment, selecting any active item in active sweep area 311, status report area 319, and correspondence area 329 causes vendor search results screen 400 to be displayed. In an exemplary embodiment, an active item is an area on a display that is hyperlinked to another screen or area.

Recognized Statements Area

In an exemplary embodiment, recognized statements area 340 displays recognized statements information about at least one vendor statement that has been recognized as a vendor statement. In an exemplary embodiment, the recognized statements information may include an identification value of the recognized vendor statement, a name of the vendor corresponding to the recognized vendor statement, a date when the recognized vendor statement was received, and a number of pages of the recognized vendor statement. In an exemplary embodiment, recognized statements area 340 displays recognized statements information about at least one vendor statement that corresponds to the at least one aged line item. In an exemplary embodiment, the recognized statements information is ordered by a probability to yield claims. In an exemplary embodiment, information about the at least one recognized vendor statement is ordered by a probability to yield claims.

Recognized Faxes Area

In an exemplary embodiment, recognized faxes area 345 displays recognized faxes information about at least one facsimile that is recognized and that is not a vendor statement. In an exemplary embodiment, the recognized faxes information may include a name of the vendor corresponding to the recognized facsimile, an identification value of the recognized facsimile, a date when the recognized facsimile was received, a rank of the recognized facsimile, and a number of pages of the recognized facsimile.

Unrecognized Areas

In an exemplary embodiment, unrecognized area 350 displays unrecognized information about at least one facsimile that is unrecognized. In an exemplary embodiment, the unrecognized area 350 may include a date when the unrecognized facsimile was received and a number of pages of the unrecognized facsimile.

Report Screen

Figure 3B:
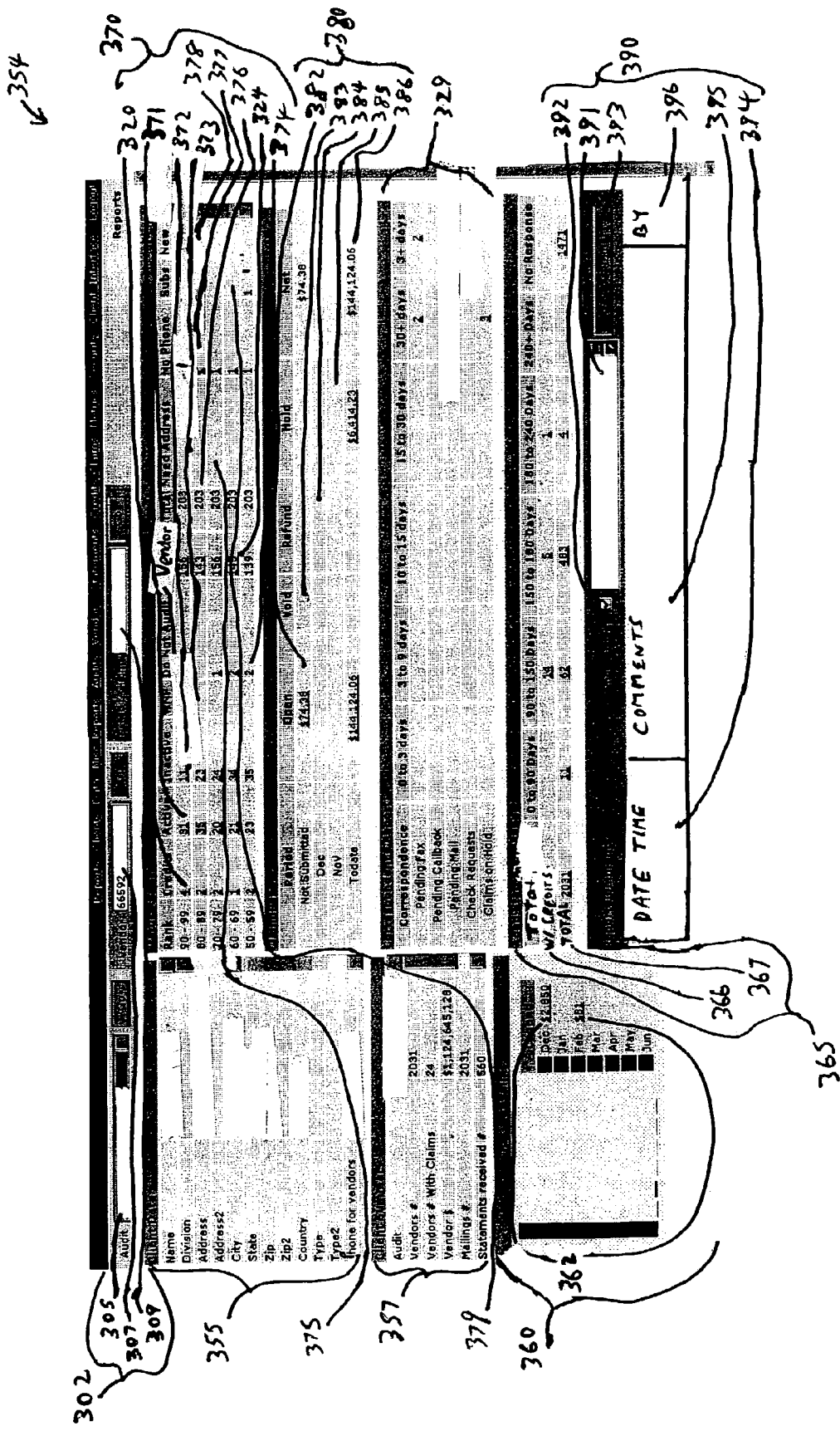
FIG. 3B is a diagram of a report screen in accordance with an exemplary embodiment of the present invention.

In an exemplary embodiment, the present invention displays at least one aged line item in a report screen 354, as shown in FIG. 3B. In an exemplary embodiment, report screen 354 includes selection area 302, a client data area 355, a client summary area 357, a future claims area 360, a status report area 370, a claim report area 380, correspondence report area 329, an aged statement report area 365, and a report comments area 390.

Client Data Area

In an exemplary embodiment, client data area 355 displays client data about a particular client. In an exemplary embodiment, the client data may include the name of the client, a division of the client, an address of the client, a city of the client, a state of the client, a zip code of the client, a country of the client, types of the client, and a phone number for vendors of the client.

Client Summary Area

In an exemplary embodiment, client data area 355 displays client summary information about a particular client. In an exemplary embodiment, the client summary information may include an audit identifier for the client, a number of vendors of the client, a number of vendors with claims of the client, a dollar amount of the vendors of the client, a number of mailings of the client, and a number of statement of the client.

Future Claims Area

In an exemplary embodiment, future claims area 360 displays estimates of at least one future claim corresponding to the aged line item. In an exemplary embodiment, future claims area 360 includes a monthly aging credits current month dollar amount 362 for at least one month. In an exemplary embodiment, monthly aging credits current month dollar amount area 362 indicates if there are any line items that will come of age in the month that have to be verified and deducted.

Status Report Area

In an exemplary embodiment, status report area 370 includes credits area 320, an active area 371, an inactive area 372, a WNP (i.e. will not provide) area 373, a do not audit area 374, vendor area 324, a total area 376, a need address area 375, a no phone area 377, a new area 378, and a subs area 379.

In an exemplary embodiment, active area 371 displays the number of vendors, by rank, whose vendor statements are active. In an exemplary embodiment, inactive area 372 displays the number of vendors, by rank, whose vendor statements are inactive. In an exemplary embodiment, WNP area 373 displays the number of vendors, by rank, whose vendor statements are WNP.

In an exemplary embodiment, do not audit area 374 displays the number of vendors, by rank, whose vendor statements are not to be audited. In an exemplary embodiment, total area 376 displays the total number of vendors, by rank. In an exemplary embodiment, need address area 375 displays the number of vendors, by rank, for whom an address is needed.

In an exemplary embodiment, no phone area 377 displays the number of vendors, by rank, for whom there is no phone number. In an exemplary embodiment, new area 378 displays the total number of vendors, whose vendor statements are new. In an exemplary embodiment, subs area 379 displays the number of vendors, by rank, who are subsidiaries.

Claim Report Area

In an exemplary embodiment, claim report area 380 includes an open column area 382, a void column area 383, a refund column area 384, a hold column area 385, and a net column area 386. In an exemplary embodiment, claim report area 380 displays a dollar amount of claims that have been submitted to a client and a dollar amount of claims that have to be batched.

In an exemplary embodiment, open column area 382 displays a dollar amount of claims that are open. In an exemplary embodiment, void column area 383 displays a dollar amount of claims that are void. In an exemplary embodiment, refund column area 384 displays a dollar amount of claims that are to be refunded. In an exemplary embodiment, hold column area 385 displays a dollar amount of claims that are on hold. In an exemplary embodiment, net column area 386 displays a net dollar amount of claims.

Aged Statement Report Area

In an exemplary embodiment, aged statement report area 365 displays aging information of the at least one aged line. In an exemplary embodiment, aged statement report area 365 includes a with credits row area 366 and a total row area 367. In an exemplary embodiment, aged statement report area 365 displays the number of aged line items that have aged for a certain amount of time.

In an exemplary embodiment, credits row area 366 displays the number of aged line statements with credits that have aged for a certain amount of time. In an exemplary embodiment, total row area 367 displays a total number of aged line items that have aged for a certain amount of time.

Report Comments Area

In an exemplary embodiment, report comments area 390 displays report comments about the at least one aged line item. In an exemplary embodiment, report comments area 390 includes a comments entry area 391, a save comments area 393, a show activity area 392, a date time area 394, a comments area 395, and a by area 396. In an exemplary embodiment, report comments area 390 allows for the entry of comments about the at least one aged line item.

In an exemplary embodiment, comments entry area 391 allows for the entry of comments about the at least one aged line item. In an exemplary embodiment, save comments area 393 allows for the saving of the entered comments. In an exemplary embodiment, show activity area 392 allows for the selection of showing database activity for the at least one aged line item. In an exemplary embodiment, date time area 394 displays date and time information of when the comments were entered. In an exemplary embodiment, comments area 395 displays the entered comments and/or the database activity for the at least one aged line item. In an exemplary embodiment, by area 396 displays by whom the comments were entered.

Vendor Search Results Screen

In an exemplary embodiment, as shown in FIG. 4, the present invention displays vendor data via vendor search results screen 400. In an exemplary embodiment, vendor search results screen 400 includes a jump results area 405, a vendor information area 410, a vendor contact area 420, a statement area 430, a claim summary area 440, and a credit pending area 450. In an exemplary embodiment, jump results area 405 displays the number of vendor search results, X, resulting from a search for vendor data.

Vendor Information Area

Figure 5A:
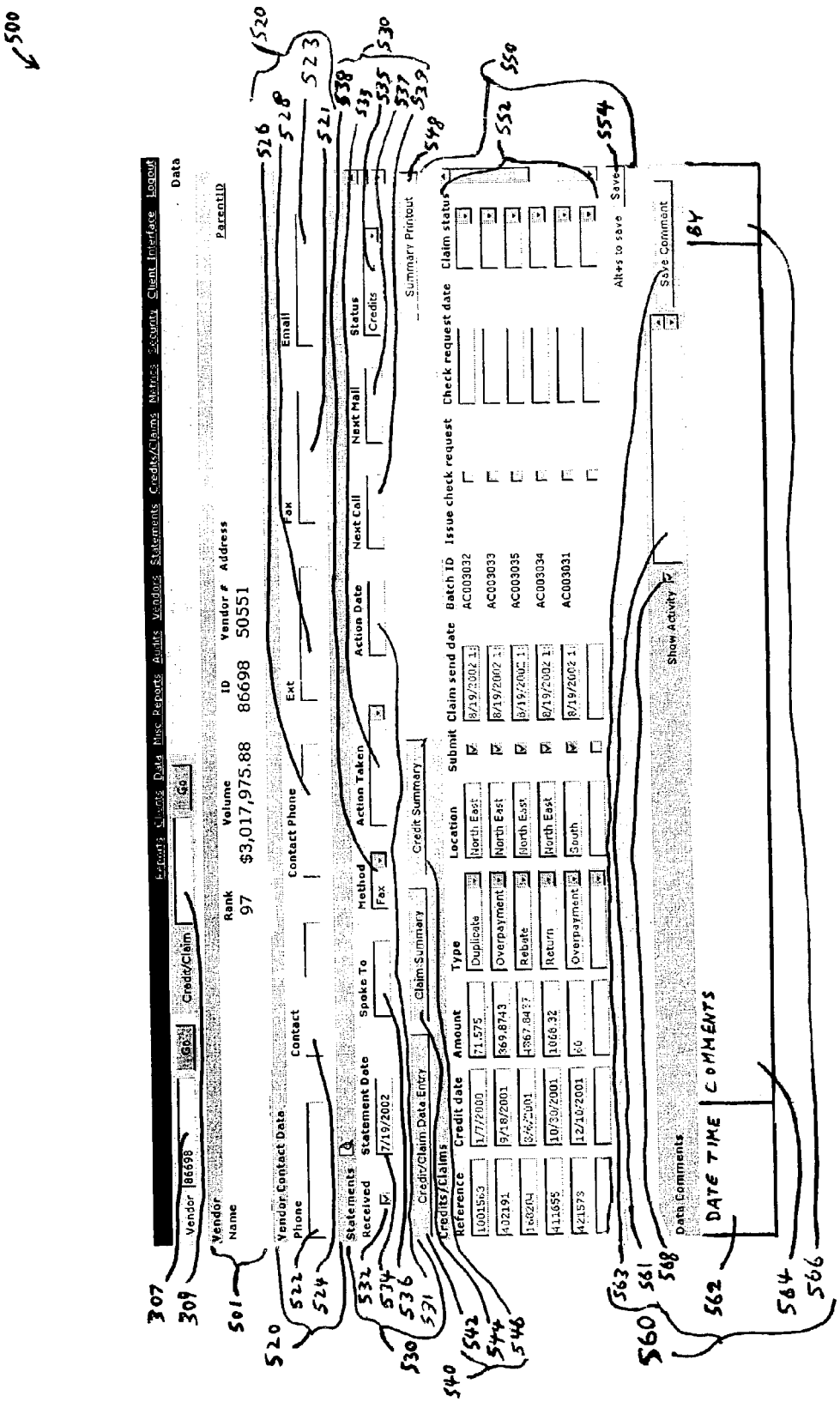
FIG. 5A is a diagram of a data screen in accordance with an exemplary embodiment of the present invention.

In an exemplary embodiment, vendor information area 410 displays information about at least one vendor among the vendor search results, such as the vendor's name, city, volume, rank, vendor number, and phone number. In an exemplary embodiment, vendor information area 410 includes a least one vendor name area 412 that displays the vendor's name. In an exemplary embodiment, a selecting vendor name area 412 causes a data screen 500, as shown in FIG. 5A, to be displayed for the vendor with the vendor name in the selected vendor name area 412.

Vendor Contact Area and Statement Area

In an exemplary embodiment, vendor contact area 420 displays contact information of at least one vendor among the vendor search results, such as the name of a contact person at the vendor and that contact person's phone number, facsimile number and e-mail address. In an exemplary embodiment, statement area 430 displays information about at least one vendor statement among the vendor search results, where the information includes the date of the vendor statement and the status of the vendor statement. In an exemplary embodiment, the status of the vendor statement may be credits, active, inactive, do not audit, subsidiary, or no phone number. In a further embodiment, the status of the vendor statement may be definable by a user.

Claim Summary Area

In an exemplary embodiment, claim summary area 440 displays information about at least one set of claims among the vendor search results, such as the dollar amount of the set of claims, the number of claims in the set of claims, and the number of claim batches for the set of claims. In an exemplary embodiment, claim summary area 440 includes a least one dollar amount of the set of claims area 442 that displays the dollar amount of the set of claims. In an exemplary embodiment, selecting dollar amount of the set of claims area 442 causes a claims summary area 580, as shown in FIG. 5C, to be displayed in a credits/claims interaction area 552 in FIG. 5A for the set of claims corresponding to the selected dollar amount of the set of claims area 442.

Credit Pending Area

In an exemplary embodiment, credit pending area 450 displays information about at least one set of pending credits among the vendor search results, such as the dollar amount of the set of pending credits and the number of pending credits in the set of pending credits. In an exemplary embodiment, credit pending area 450 includes a least one dollar amount of the set of pending credits area 452 that displays the dollar amount of the set of pending credits. In an exemplary embodiment, selecting dollar amount of the set of pending credits area 452 causes a credits/claims data area 510 to be displayed, as shown in FIG. 5E, in a credits/claims interaction area 552 in a data screen 500 in FIG. 5A for the set of pending credits corresponding to the selected dollar amount of the set of pending credits area 452.

Identifying Credit Data

In step 220, the present invention identifies credit data among the at least one displayed aged line item, thereby identifying credit data on a line item basis. In an exemplary embodiment, the credit data includes at least one identified credit.

In an exemplary embodiment, auditor screen 300 identifies credit data via active sweep area 311 and status report area 319. In an exemplary embodiment, auditor screen 300 allows an auditor to identify credit data. In other words, auditor screen 300 allows the auditor to identify credits among the at least one displayed aged line item, thereby allowing the auditor to identify credit data on a line item basis.

In an exemplary embodiment, vendor search results screen 400 also identifies credit data via claims summary area 440 and credit pending area 450. In an exemplary embodiment, vendor search results screen 400 allows an auditor to identify credit data. In other words, vendor search results screen 400 allows the auditor to identify credits among the at least one displayed aged line item, thereby allowing the auditor to identify credit data on a line item basis.

Recording Identified Credit Data

In step 230, the present invention records the identified credit data that includes at least one aged line item, thereby recording at least one potential claim. In an exemplary embodiment, the credit data includes at least one recorded credit.

Data Screen

In an exemplary embodiment, in step 230, the present invention records credit data for aged line items via data screen 500, as shown in FIG. 5A, for the vendor selected in vendor search results screen 400. In an exemplary embodiment, data screen 500 also displays vendor data for the selected vendor. In an exemplary embodiment, data screen 500 includes vendor select area 307, credit/claim select area 309, a vendor area 510, a vendor contact data area 520, a statements area 530, a credit/claims selection area 540, and a credit/claims information area 550, and a data comments area 560. Data screen 500 displays both contact level data and claim detail data for the selected vendor. In an exemplary embodiment, in step 230, the present invention records credit data for aged line items via data screen 500, as shown in FIG. 5A, for a vendor.

Vendor Area

In an exemplary embodiment, vendor area 501 displays information about the selected vendor, such as the vendor's name, rank, volume, vendor identification, vendor number, address, and parent identification.

Vendor Contact Data Area

In an exemplary embodiment, vendor contact data area 520 displays contact information of the selected vendor, such as the phone number of a contact person at the vendor and the contact person's name, contact phone number, extension, facsimile number and e-mail address. In an exemplary embodiment, vendor contact data area 520 includes a phone area 522, a contact area 524, a contact phone area 526, an extension area 528, a facsimile area 521, and an e-mail area 523. In an exemplary embodiment, vendor contact data area 520 allows for the entry of contact data for a vendor.

In an exemplary embodiment, phone area 522 allows for the entry of the contact person's phone number. In an exemplary embodiment, contact area 524 allows for the entry of the contact person's name. In an exemplary embodiment, contact phone area 526 allows for the entry of the contact person's contact phone number. In an exemplary embodiment, extension area 528 allows for the entry of the contact person's extension. In an exemplary embodiment, facsimile area 521 allows for the entry of the contact person's facsimile number. In an exemplary embodiment, e-mail area 523. allows for the entry of the contact person's e-mail address.

Statements Area

In an exemplary embodiment, statements area 530 displays information about at least one vendor statement of the selected vendor, such as whether the vendor statement has been received, the vendor statement's date, the name of whom was spoken to about the vendor statement, the method of delivery of the vendor statement, the action taken on the vendor statement, the date of the action taken on the vendor statement, the next call of the vendor statement, the next mail of the vendor statement, and the status of the vendor. In an exemplary embodiment, statements area 530 includes a received area 532, a statement date area 534, a spoke to area 536, a method area 538, an action taken area 533, an action date area 531, a status area 535, a next mail area 537, and a next call area 539.

In an exemplary embodiment, received area 532 allows for the entry of whether the vendor statement has been received. In an exemplary embodiment, statement date area 534 allows for the entry of the vendor statement's date. In an exemplary embodiment, spoke to area 536 allows for the entry of the name of whom was spoken to about the vendor statement. In an exemplary embodiment, method area 538 allows for the entry of the method of delivery of the vendor statement. In an exemplary embodiment, action taken area 533 allows for the entry of the action taken on the vendor statement, such as promised fax and promised mail. In an exemplary embodiment, action date area 531 allows for the entry of the date of the action taken on the vendor statement. In an exemplary embodiment, status area 535 allows for the entry of the status of the vendor. In an exemplary embodiment, next mail area 537 allows for the entry of the next mail of the vendor statement, where the next mail of the vendor statement is the date of when to mail the vendor next. In an exemplary embodiment, next call area 539 allows for the entry of the next call of the vendor statement, where the next call of the vendor statement is the date of when to call the vendor next.

Credit/Claims Selection Area

In an exemplary embodiment, credit/claims selection area 540 allows for the selection of information about credits/claims, credits, or claims for the selected vendor. In an exemplary embodiment, credit/claims selection area 540 includes a credit/claim data entry select area 542, a claim summary select area 544, a credit summary select area 546, and a summary printout select area 548.

Figure 5B:
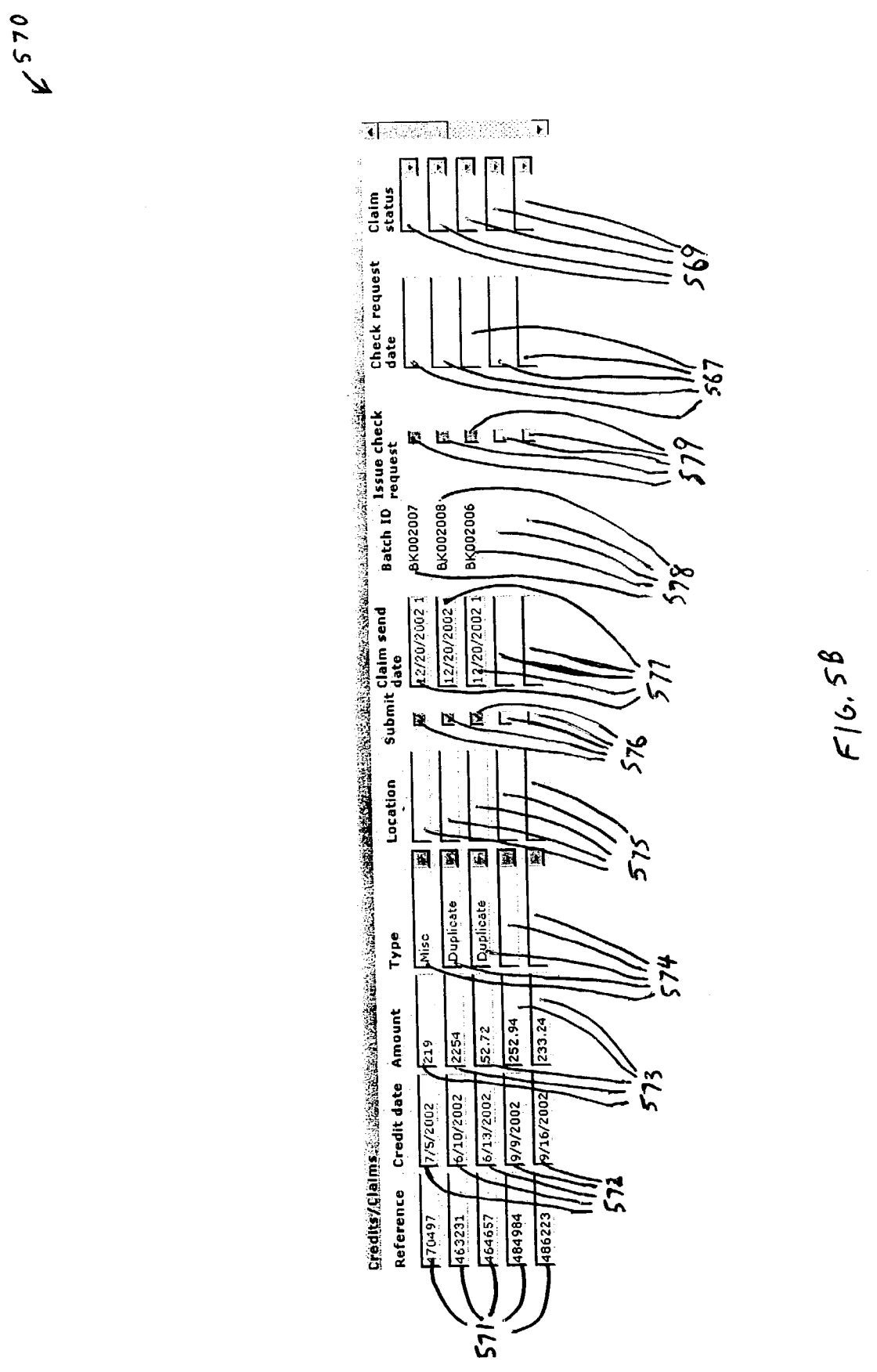
Figure 5E:
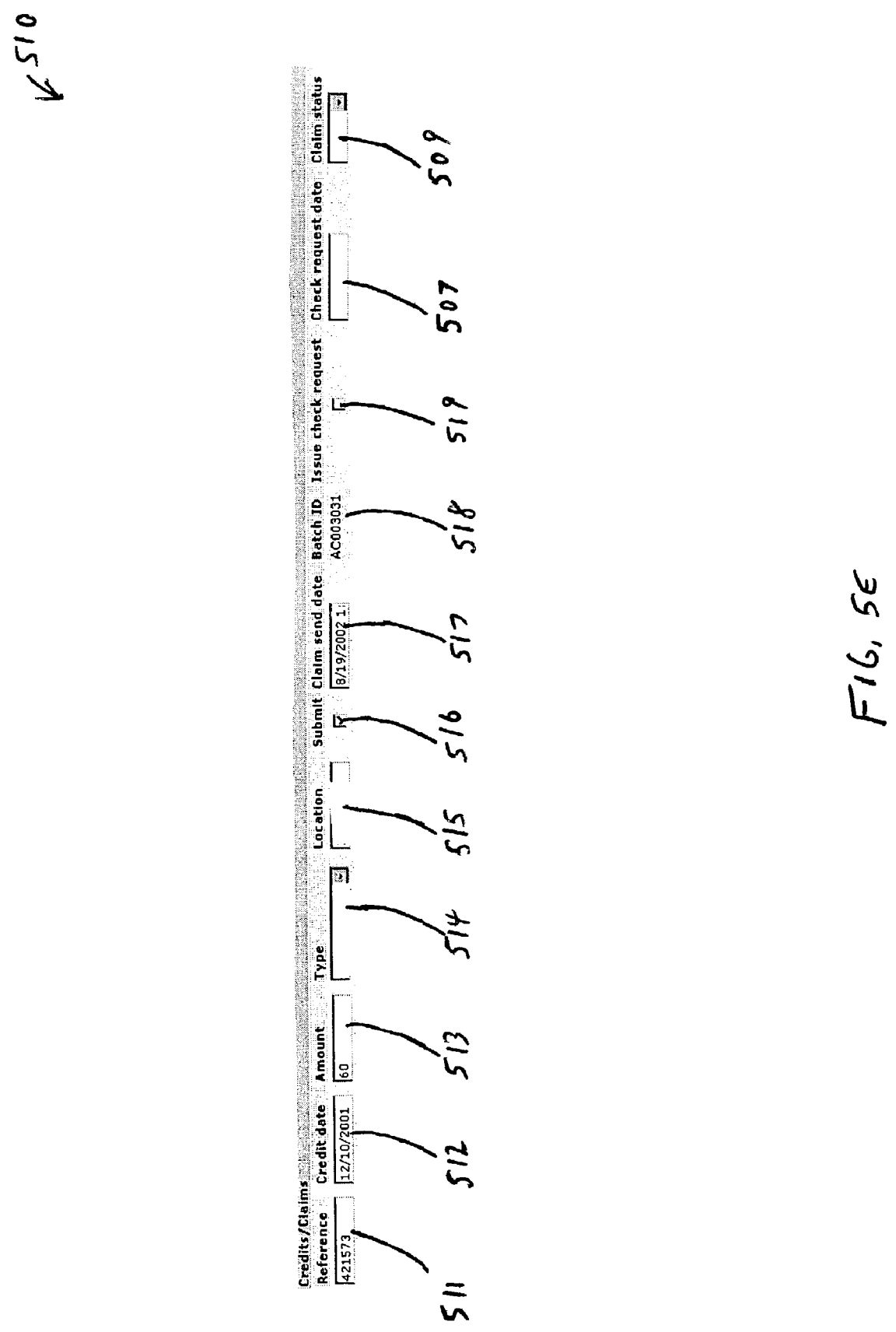

In an exemplary embodiment, credit/claim data entry select area 542 allows for the selection of entering credit or claim/claims information for the selected vendor in a credits/claims area 570 in FIG. 5B. In an exemplary embodiment, claim summary select area 544 allows for the selection of obtaining a summary of claims for the selected vendor in a claims summary area 580 in FIG. 5C. In an exemplary embodiment, credit summary select area 546 allows for the selection of obtaining a summary of credits for the selected vendor in a credit summary area 590 in FIG. 5D. In an exemplary embodiment, summary printout select area 548 allows for the selection of the printing of information displayed in credit/claims information area 550.

Credit/Claims Information Area

In an exemplary embodiment, credit/claims information area 550 allows for the interaction with information about credits/claims, credits, or claims of the selected vendor. In an exemplary embodiment, credit/claims information area 550 includes credits/claims interaction area 552 and a save area 554.

In an exemplary embodiment, credits/claims interaction area 552 displays a credits/claims area 570, as shown in FIG. 5B, when credit/claim data entry select area 542 is selected. In an exemplary embodiment, credits/claims interaction area 552 displays claims summary area 580, as shown in FIG. 5C, when claim summary select area 544 is selected. In an exemplary embodiment, credits/claims interaction area 552 displays a credits summary area 590, as shown in FIG. 5D, when credit summary select area 546 is selected. In an exemplary embodiment, save area 554 allows for the saving of the credit/claims information entered on credits/claims screen 570 when save area 554 is selected. In an exemplary embodiment, credits/claims interaction area 552 can display credits/claims data area 510, as shown in FIG. 5E.

Data Comments Area

In an exemplary embodiment, data comments area 560 displays data comments about the selected vendor. In an exemplary embodiment, data comments area 560 includes a comments entry area 561, a save comments area 563, a show activity area 568, a date time area 562, a comments area 564, and a by area 566. In an exemplary embodiment, data comments area 560 allows for the entry of comments about the selected vendor.

In an exemplary embodiment, comments entry area 561 allows for the entry of comments about the data entered via data screen 500. In an exemplary embodiment, save comments area 563 allows for the saving of the entered comments. In an exemplary embodiment, show activity area 568 allows for the selection of showing database activity for the selected vendor. In an exemplary embodiment, date time area 562 displays date and time information of when the comments were entered. In an exemplary embodiment, comments area 564 displays the entered comments and/or the database activity for the selected vendor. In an exemplary embodiment, by area 566 displays by whom the comments were entered.

Credits/Claims Area

In an exemplary embodiment, as shown in FIG. 5B, credits/claims area 570 allows for the entry and display of credits/claims information of the selected vendor. In an exemplary embodiment, credits/claims area 570 includes a reference area 571, a credit date area 572, an amount area 573, a type area 574, a location area 575, a submit area 576, a claim send date area 577, a batch identification area 578, an issue check request area 579, a check request date area 567, and a claim status area 569. In an exemplary embodiment, credits/claims area 570 allows for the entry of at least one line item for the selected vendor.

In an exemplary embodiment, reference area 571 allows for the entry of a reference value for a particular line item. In an exemplary embodiment, credit date area 572 allows for the entry of a date when the line item was created. In an exemplary embodiment, upon the entry of the date when the line item was created, the line item is aged until its Nth month. In an exemplary embodiment, amount area 573 allows for the entry of the amount of the line item. In an exemplary embodiment, type area 574 allows for the entry of a type of line item for the line item, where the values of the type of line item are definable. For example, the values of the type of line item may include duplicate payments, rebates, return, unapplied cash, overpayment, and miscellaneous.

In an exemplary embodiment, location area 575 allows for the entry of a location associated with the line item. In an exemplary embodiment, the location is where at the client does the vendor believe that the line item belong. In an exemplary embodiment, submit area 576 allows for designating that the line item should be submitted when submit area 576 is selected. In an exemplary embodiment, claim send date area 577 allows for the entry of a date when a claim was sent for the line item. In an exemplary embodiment, batch identification area 578 displays a batch identification value for the line item.

In an exemplary embodiment, issue check request area 579 allows for designating that a check request should be issued for the line item when check request area 579 is selected. In an exemplary embodiment, check request date area 567 allows for the entry of a date when the check request was made for the line item. In an exemplary embodiment, claim status area 569 allows for the entry of a status of a claim for the line item.

Claims Summary Area

In an exemplary embodiment, as shown in FIG. 5C, claims summary area 580 displays a summary of claim information about at least one line item associated with at least one claim of the selected vendor. In an exemplary embodiment, claims summary area 580 includes an audit area 581, a statement area 582, a status area 583, a spoke to area 584, a line item area 585, a credit date area 586, an amount area 587, a reference area 588, a type area 589, a claim date area 565, a claim status area 556, a batch area 558, and a batch date area 553. Claims summary area 580 displays historical data about the claims for the selected vendor.

In an exemplary embodiment, audit area 581 displays the name of the audit for a particular line item. In an exemplary embodiment, selecting audit area 581 causes report screen 354, as shown in FIG. 3B, to be displayed for the audit corresponding to the selected audit area 581. In an exemplary embodiment, statement area 582 displays the date of a vendor statement for the line item. In an exemplary embodiment, selecting statement area 582 causes an image of the vendor statement corresponding to the selected statement area 582 to be displayed. In an exemplary embodiment, status 583 displays the status of the line item.

In an exemplary embodiment, spoke to area 584 displays the name of the person at the vendor to whom the claim was spoken about in step 240. In an exemplary embodiment, line item area 585 displays a line item identifier for the claim. In an exemplary embodiment, selecting line item area 585 causes credits/claims data area 510, as shown in FIG. 5E, to be displayed in credits/claims interaction area 552 for the claim corresponding to the selected line item area 585.

In an exemplary embodiment, credit date area 586 displays the date when a credit was created. In an exemplary embodiment, selecting credit date area 586 also causes credits/claims data area 510, as shown in FIG. 5E, to be displayed in credits/claims interaction area 552 for the claim corresponding to the selected credit date area 586. In an exemplary embodiment, amount area 587 displays the amount of the claim.

In an exemplary embodiment, reference area 588 displays a reference value for the line item. In an exemplary embodiment, selecting reference area 588 also causes credits/claims data area 510, as shown in FIG. 5E, to be displayed in credits/claims interaction area 552 for the claim corresponding to the selected reference area 588. In an exemplary embodiment, type area 589 displays the type of the claim. In an exemplary embodiment, claim date area 565 displays the date and time of the claim. In an exemplary embodiment, claim status area 556 displays the status of the claim. In an exemplary embodiment, batch area 558 displays a batch identification value of the claim. In an exemplary embodiment, batch date area 553 displays the date that the batch associated with the claim occurred.

Credits Summary Area

In an exemplary embodiment, as shown in FIG. 5D, credits summary area 590 displays a summary of information about at least one credit of the selected vendor. In an exemplary embodiment, credits summary area 590 includes audit area 581, statement area 582, status area 583, credit date area 586, a month due area 592, an amount area 594, reference area 588, and a type area 596. Credits summary area 590 displays data about credits that are aging but that have not been validated.

In an exemplary embodiment, month due area 592 displays the month when the credit is due. In an exemplary embodiment, amount area 594 displays the amount of the credit. In an exemplary embodiment, type area 596 displays the type of the credit.

Credits/Claims Data Area

In an exemplary embodiment, as shown in FIG. 5E, credits/claims data area 510 allows for the entry and display of credits/claims information of the selected vendor for a line item. In an exemplary embodiment, credits/claims data area 510 includes a reference area 511, a credit date area 512, an amount area 513, a type area 514, a location area 515, a submit area 516, a claim send date area 517, a batch identification area 518, an issue check request area 519, a check request date area 507, and a claim status area 509. In an exemplary embodiment, credits/claims data area 510 allows for the entry of one line item for the selected vendor.

In an exemplary embodiment, reference area 511 allows for the entry of a reference value for the line item. In an exemplary embodiment, credit date area 512 allows for the entry of a date when the line item was created. In an exemplary embodiment, amount area 513 allows for the entry of the amount of the line item. In an exemplary embodiment, type area 514 allows for the entry of a type of line item for the line item, where the values of the type of line item are definable. For example, the values of the type of line item may include duplicate payments, rebates, return, unapplied cash, overpayment, and miscellaneous.

In an exemplary embodiment, location area 515 allows for the entry of a location associated with the line item. In an exemplary embodiment, the location is where at the client does the vendor believe that the line item belong. In an exemplary embodiment, submit area 516 allows for designating that the line item should be submitted when submit area 516 is selected. In an exemplary embodiment, claim send date area 517 allows for the entry of a date when a claim was sent for the line item. In an exemplary embodiment, batch identification area 518 displays a batch identification value for the line item.

In an exemplary embodiment, issue check request area 519 allows for designating that a check request should be issued for the line item when check request area 519 is selected. In an exemplary embodiment, check request date area 507 allows for the entry of a date when the check request was made for the line item. In an exemplary embodiment, claim status area 509 allows for the entry of a status of a claim for the line item.

Validating Recorded Credit Data

In step 240, in an exemplary embodiment, the present invention allows for at least one auditor to contact at least one vendor corresponding to the recorded credit data in order to verify that the at least one aged line item can be submitted for deduction, thereby validating the recorded credit data. In an exemplary embodiment, in step 240, the present invention allows for at least one auditor to contact at least one customer corresponding to the recorded credit data in order to verify that the at least one aged line item can be submitted for deduction, thereby validating the recorded credit data.

Publishing Validated Credit Data as Claim Batch Data

In step 250, the present invention publishes validated credit data as claim batch data. In an exemplary embodiment, the claim batch data includes at least one claim batch document that includes the validated credit data. In an exemplary embodiment, the validated credit data includes credit data that has met specified contractual audit terms. In an exemplary embodiment, the claim batch document is associated with a prefix and a serial batch number. In an exemplary embodiment, each prefix is associated with a particular vendor. In an exemplary embodiment, each prefix is associated with a particular customer. In an exemplary embodiment, the claim batch document can be communicated to at least one vendor by e-mail or by providing an encrypted Internet uniform resource locator (URL) address of the invoice document. In an exemplary embodiment, the claim batch document can be communicated to at least one customer by e-mail or by providing an encrypted Internet URL address of the invoice document. In an exemplary embodiment, the validated credit data is validated with at least one vendor. In an exemplary embodiment, the validated credit data is validated with at least one customer.

Audit Screen

Figure 6A:
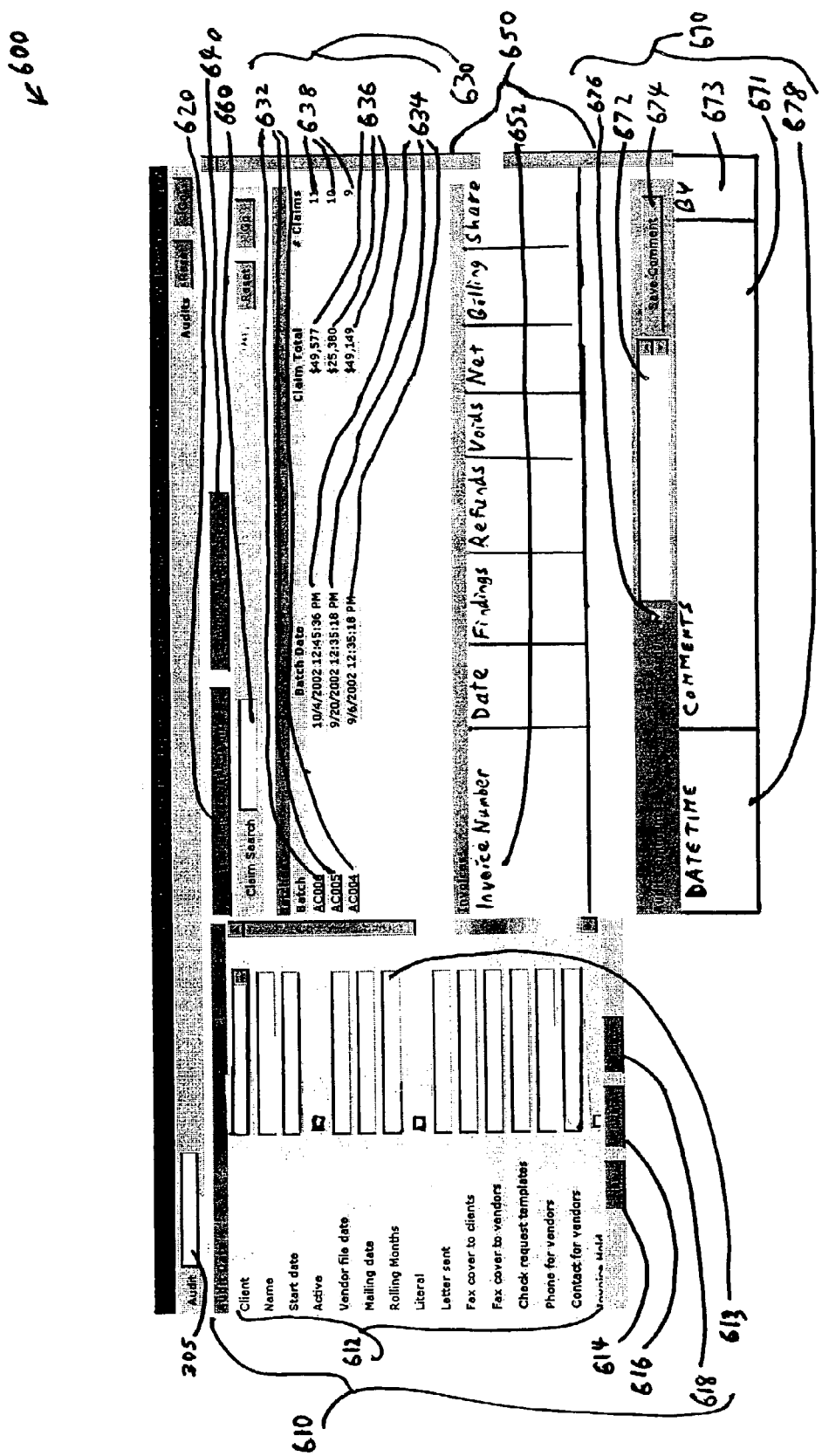
FIG. 6A is a diagram of an audit screen in accordance with an exemplary embodiment of the present invention.

In an exemplary embodiment, in step 250, the present invention publishes validated credit data as claim batch data via an audit screen 600, as shown in FIG. 6A. In an exemplary embodiment, audit screen 600 includes audit select area 305, an audit data area 610, a batch process new claims area 620, a batches area 630, an invoice new batches area 640, an invoices area 650, a claim search area 660, and an audit comments area 670.

Audit Data Area

In an exemplary embodiment, audit data area 610 displays and allows for the entry of confidential audit data, such as the name of a client, terms of the audit, and contact information for the client. In an exemplary embodiment, audit data area 610 includes confidential audit data area 612, a rolling months area 613, a new area 614, an update area 616, and a delete area 618.

In an exemplary embodiment, confidential audit data area 612 allows for the display and entry of confidential audit data, such as the name of a client, terms of the audit, and contact information for the client. In an exemplary embodiment, the terms of the audit include a start date of an audit. In an exemplary embodiment, rolling months area 613 allows for the entry of the number of rolling months, N, to be used in the audit.

In an exemplary embodiment, new area 614 allows for selection of the creating of a new set of confidential audit data. In an exemplary embodiment, update area 616 allows for the selection of the updating of a set of audit data. In an exemplary embodiment, delete area 618 allows for the selection of the deleting of a set of audit data.

Batch Process New Claims Area

In an exemplary embodiment, batch process new claims area 620 allows for the selection of batch processing new claims. In an exemplary embodiment, selecting batch process new claims area 620 causes a batch preview screen 680, as shown in FIG. 6B, to be displayed.

Batches Area

In an exemplary embodiment, batches area 630 displays information about at least one batch performed for a client. In an exemplary embodiment, batches area 630 includes a batch area 632, a batch date area 634, a claim total area 636, and a number of claims area 638.

In an exemplary embodiment, batch area 632 displays a batch identification value of at least one batch performed for the client. In an exemplary embodiment, selecting batch area 632 causes a batch screen 690, as shown in FIG. 6C, to be displayed.

In an exemplary embodiment, batch date area 634 displays the date and time of a batch corresponding to batch area 632. In an exemplary embodiment, claim total area 636 displays the total value of the at least one claim that was processed in the batch corresponding to batch area 632. In an exemplary embodiment, number of claims area 638 displays the number of claims that were processed in the batch corresponding to batch area 632.

Audit Comments Area

In an exemplary embodiment, audit comments area 670 displays comments about the audit corresponding to the confidential audit data. In an exemplary embodiment, audit comments area 670 includes a comments entry area 672, a save comments area 674, a show activity area 676, a date time area 678, a comments area 671, and a by area 673. In an exemplary embodiment, audit comments area 670 allows for the entry of comments about the audit corresponding to the confidential audit data.

In an exemplary embodiment, comments entry area 672 allows for the entry of comments about the audit. In an exemplary embodiment, save comments area 674 allows for the saving of the entered comments. In an exemplary embodiment, show activity area 676 allows for the selection of showing database activity for the audit. In an exemplary embodiment, date time area 678 displays date and time information of when the comments were entered. In an exemplary embodiment, comments area 671 displays the entered comments and/or the database activity for the audit. In an exemplary embodiment, by area 673 displays by whom the comments were entered.

Batch Preview Screen

In an exemplary embodiment, in step 250, the present invention publishes validated credit data as claim batch data via batch preview screen 680, as shown in FIG. 6B. In an exemplary embodiment, batch preview screen 680 includes a claim batch document area 682, a commit area 684, and a cancel area 686.

In an exemplary embodiment, claim batch document area 682 displays a preview of a batch claim document. In an exemplary embodiment, commit area 684 allows for the selection of committing the batch claim document to a published batch claim document. In an exemplary embodiment, a published batch claim document can be viewed by a client. In an exemplary embodiment, cancel area 686 allows for the selection of canceling the batch claim document. In an exemplary embodiment, a canceled batch claim document cannot be viewed by a client.

Batch Screen

In an exemplary embodiment, in step 250, the present invention publishes validated credit data as claim batch data via batch screen 690, as shown in FIG. 6C. In an exemplary embodiment, batch screen 690 includes claim search area 660, a batch summary area 691, a batch detail area 692, a printable batch document area 698, and a save area 699. In an exemplary embodiment, batch screen 690 displays information about a batch corresponding to a selected batch area 632. In an exemplary embodiment, printable batch document area 698 allows for the selection of the obtaining of a printable batch document corresponding to the claim batch data. In an exemplary embodiment, save area 699 allows for the selection of the saving of at least one entry in batch screen 690.

Batch Summary Area

In an exemplary embodiment, batch summary area 691 displays a batch identifier associated with a batch corresponding to the claim batch data, a date of the creation of the batch, a period of the batching of the batch, line items that were batched in the batch, a number of claims batched in the batch, a number of refunds in the batch, a number of voids in the batch, a number of holds in the batch, a total number of line items in the batch, a dollar amount of the claims in the batch, and a dollar amount of the total number of line items in the batch.

Batch Detail Area

In an exemplary embodiment, batch detail area 692 displays batch detail information, such as the name of vendor associated with a line item in a batch corresponding to the claim batch data, a line item identifier, a reference value of the line item, a creation date of the line item, a monetary value of the line item, a location where the line item took place, a status of the line item, and a comment about the line item. In an exemplary embodiment, batch detail area 692 includes a vendor area 693, a line item area 694, a location area 695, a status area 696, and a comment area 697.

Vendor Area

In an exemplary embodiment, vendor area 693 displays the name of vendor associated with a line item in the batch. In an exemplary embodiment, selecting vendor area 693 causes the display of a audit vendor screen if batch screen 690 is displayed as a result of selecting batch area 632 in audit screen 600 in FIG. 6A. In a particular embodiment, the audit vendor screen displays and allows for the entry of data about a vendor corresponding to the selected vendor area 693.

Figure 7A:
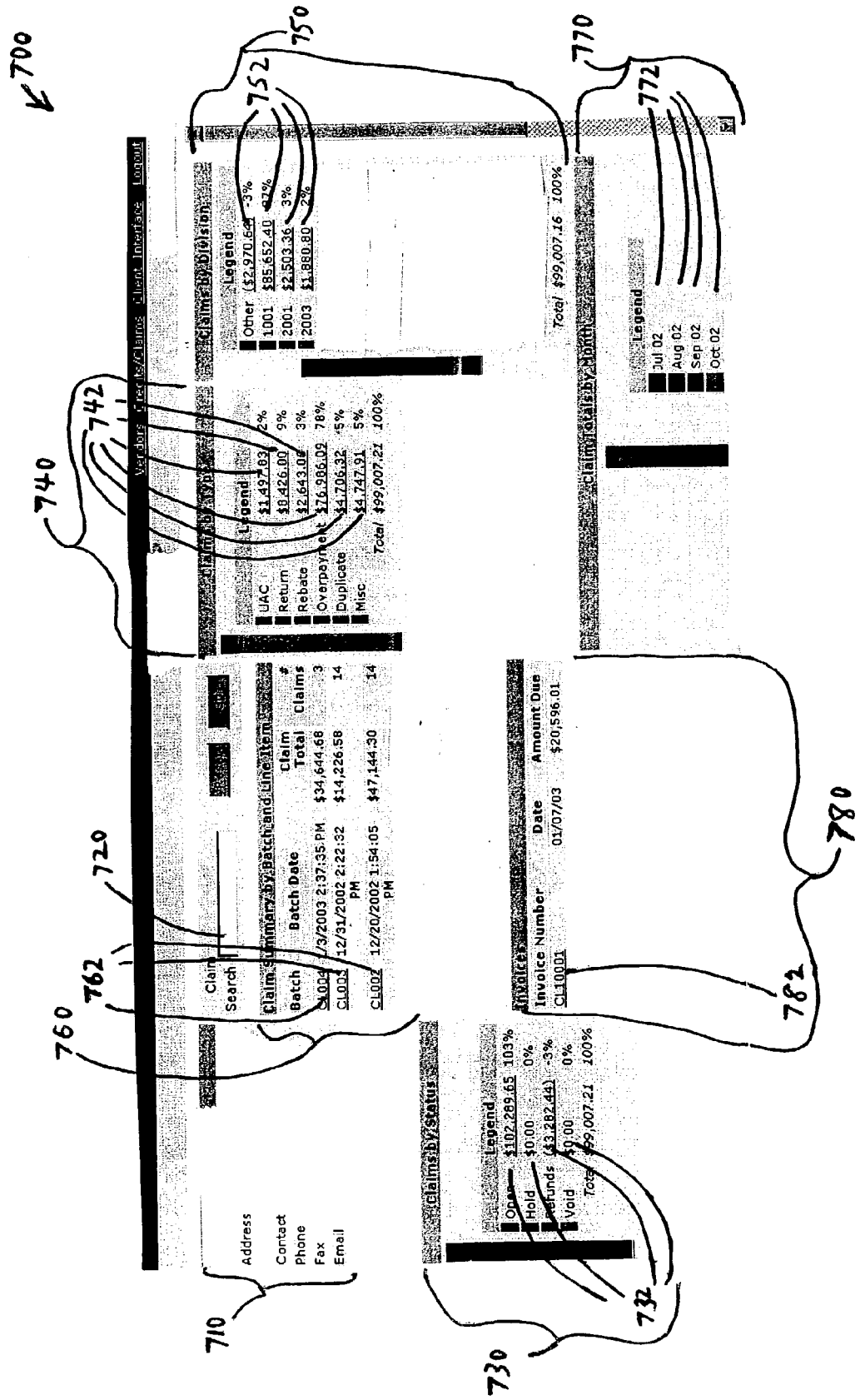
FIG. 7A is a diagram of a client interface screen in accordance with an exemplary embodiment of the present invention.

In an exemplary embodiment, selecting vendor area 693 causes the display of a client vendor screen if batch screen 690 is displayed as a result of selecting batch area 762 in FIG. 7A. In a particular embodiment, the client vendor screen displays data about a vendor corresponding to the selected vendor area 693.

Line Item Area

In an exemplary embodiment, line item area 694 displays the line item identifier of the line item corresponding to the selected line item area 694. In an exemplary embodiment, selecting line item area 694 causes a view only credits/claims screen to be displayed corresponding to at least one claim that corresponds to the selected line item area 694. In an exemplary embodiment, the view only credits/claims screen displays credits/claims displays information about at least one credit or at least on claim corresponding to the claim Location Area, Status Areas and Comment Area In an exemplary embodiment, location area 695 allows for the selection of a location of where the line item took place. In an exemplary embodiment, status area 696 allows for the selection of a status of the line item. In an exemplary embodiment, comment area 697 allows for the entry of a comment about the line item.

Managing Claim Batch Data

In step 260, the present invention manages the claim batch data. In an exemplary embodiment, in step 260, the present invention displays a client interface screen 700 as shown in FIG. 7A. Client interface screen 700 allows for the monitoring of the claim batch data in an interactive manner. In an exemplary embodiment, the interactive manner may include real-time interaction or interaction with a time interval delay. In an exemplary embodiment, the time interval is definable by a user.

In an exemplary embodiment, the client interface screen 700 allows for the placing on hold particular claims among the claim batch data. In an exemplary embodiment, client interface screen 700 allows for the communicating of comments about particular claims among the claim batch data in the interactive manner. In an exemplary embodiment, a client may use client interface screen 700 to interact with the claim batch data. In an exemplary embodiment, a vendor may use client interface screen 700 to interact with the claim batch data. In an exemplary embodiment, a customer may use client interface screen 700 to interact with the claim batch data.

Client Interface Screen

In an exemplary embodiment, step 260, the present invention manages the claim batch data via an client interface screen 700, as shown in FIG. 7A. In an exemplary embodiment, client interface screen 700 includes an auditor contact area 710, a claim select area 720, a claims by status area 730, a claims by type area 740, a claims by division area 750, a claim summary by batch and line item area 760, a claim totals by month area 770, and an invoices area 780.

In an exemplary embodiment, auditor contact area 710 displays contact information for an auditor who is performing the audit corresponding to the claim batch data. In an exemplary embodiment, claim select area 720 allows for the selection of the searching for a particular claim. In an exemplary embodiment, selecting select area 720 causes a credit/claims search results screen that displays a list of all line items corresponding to the claim batch data.

Claims by Status Area

In an exemplary embodiment, claims by status area 730 displays the status of the claims corresponding to the claim batch data. In an exemplary embodiment, claims by status area 730 displays a dollar amount and a percentage of claims that have a certain status. In an exemplary embodiment, the status may have values such as open, on hold, refunded, and void. In an exemplary embodiment, claims by status area 730 includes a dollar amount area 732 that allows for the selection of the displaying of information about the claims corresponding to the selected dollar amount area 73 in a claims search results screen 790, as shown in FIG. 7B.

Claims by Type Area

In an exemplary embodiment, claims by type area 740 displays the types of the claims corresponding to the claim batch data. In an exemplary embodiment, claims by type area 740 displays a dollar amount and a percentage of claims that are of a certain type. In an exemplary embodiment, the type may have values such as UAC (i.e. unapplied cash), COA (i.e. cash on account), return, rebate, overpayment, duplicate, and miscellaneous. In an exemplary embodiment, claims by type area 740 includes a dollar amount area 742 that allows for the selection of the displaying of information about the claims corresponding to the selected dollar amount area 742 in claims search results screen 790.

Claims by Division Area

In an exemplary embodiment, claims by division area 750 displays the divisions of the claims corresponding to the claim batch data. In an exemplary embodiment, claims by division area 750 displays a dollar amount and a percentage of claims that are of a certain division of the client. In an exemplary embodiment, the division may have values that are definable by the client. In an exemplary embodiment, claims by division area 750 includes a dollar amount area 752 that allows for the selection of the displaying of information about the claims corresponding to the selected dollar amount area 752 in claims search results screen 790.

Claim Summary by Batch and Line Item Area

In an exemplary embodiment, claim summary by batch and line item area 760 displays information about at least on claim corresponding to at least on batch and to at least one line item corresponding to the claim batch data. In an exemplary embodiment, claim summary by batch and line item area 760 displays a batch identification value, a batch date, a claim total, and a number of claims of the batch. In an exemplary embodiment, claim summary by batch and line item area 760 includes a batch area 762 that displays a batch identification value and allows for the selection of the displaying of batch screen 690, as shown in FIG. 6C.

Claim Totals by Month Area

In an exemplary embodiment, claim totals by month area 770 displays the totals of the claims corresponding to the claim batch data by month. In an exemplary embodiment, claim totals by month area 770 displays a dollar amount and a percentage of claims that are of a certain month. In an exemplary embodiment, claim totals by month area 770 includes a dollar amount area 772 that allows for the selection of the displaying of information about the claims corresponding to the selected dollar amount area 772 in claims search results screen 790.

Invoices Area

In an exemplary embodiment, invoices area 780 displays information about at least one invoice corresponding to the claim batch data. In an exemplary embodiment, invoices area 780 displays an invoice number, a date, and an amount due of the invoice. In an exemplary embodiment, invoices area 780 includes an invoice number area 782 that displays the invoice number and allows for the selection of the displaying of a invoice screen that displays the invoice corresponding to the selected invoice number area 782.

Claims Search Results Screen

In an exemplary embodiment, step 260, the present invention manages the claim batch data via claims search results screen 790, as shown in FIG. 7B. In an exemplary embodiment, claims search results screen 790 includes batch area 762, a claim search results area 798, and a claim information area 791. In an exemplary embodiment, claim search results area 798 displays the number of claim search results, Y, resulting from a search for information about at least one claim.

Claim Information Area

In an exemplary embodiment, claim information area 791 displays claim information about at least one claim in the claim batch data. In an exemplary embodiment, the claim information, for a particular claim, may include a batch identification value, a line item identification value, a vendor name, the name of a city of the vendor, a number value, a vendor identification value, a reference value, a batch date and time, an amount, a claim send date and time, and a claim status. In an exemplary embodiment, claim information area 791 includes a line item area 792, a vendor area 794, and a vendor identification area 796. In an exemplary embodiment, vendor area 794 displays information about the vendor corresponding to the selected vendor area 794.

Line Item Area

In an exemplary embodiment, line item area 792 displays the line item identification value. Selecting line item are 792 causes a view only credits/claims screen to be displayed corresponding to at least one claim that corresponds to the selected line item area 792. In an exemplary embodiment, the view only credits/claims screen displays credits/claims displays information about at least one credit or at least on claim corresponding to corresponding to the claim.

Vendor Identification Area

In an exemplary embodiment, vendor identification area 796 displays the vendor identification value. Selecting vendor identification area 796 causes a view only vendor screen to be displayed corresponding to at least one claim that corresponds to the selected vendor identification area 796. In an exemplary embodiment, the view only vendor screen displays vendor information, claims statistics, and a claims summary for the claim.

Invoicing Managed Claim Batch Data

In step 270, the present invention invoices the managed claim batch data. In an exemplary embodiment, in step 270, the present invention invoices the managed claim batch data by producing at least one invoice document for the managed claim batch data. In an exemplary embodiment, the invoice document is associated with a prefix and a serial number. In an exemplary embodiment, each prefix is associated with a particular vendor. In an exemplary embodiment, each prefix is associated with a particular customer. In an exemplary embodiment, the invoice document can be communicated to at least one vendor by e-mail or by providing an encrypted Internet URL address of the invoice document. In an exemplary embodiment, the invoice document can be communicated to at least one customer by e-mail or by providing an encrypted Internet URL address of the invoice document.

Audit Screen

In an exemplary embodiment, in step 270, the present invention invoices the managed claim batch data via audit screen 600, as shown in FIG. 6A. In an exemplary embodiment, invoice new batches area 640 allows for the selection of the invoicing new batches corresponding to the managed claim batch data. Selecting invoice new batches area 640 causes an invoice preview screen 800, as shown in FIG. 8, to be displayed.

Invoices Area

In an exemplary embodiment, invoices area 650 displays invoice information about at least one invoice generated for a client. In an exemplary embodiment, the invoice information may include an invoice number of the invoice, a date of the invoice, a findings amount of the invoice, a refunds amount of the invoice, a voids amount of the invoice, a net amount of the invoice, a billing amount of the invoice, and a share amount of the invoice. In an exemplary embodiment, invoices area 650 includes an invoice number area 652 that displays a invoice number of at least invoice generated for a client. In an exemplary embodiment, selecting invoice number area 652 causes an image of the invoice to be displayed.

Invoice Preview Screen

In an exemplary embodiment, in step 270, the present invention invoices the managed claim batch data via invoice review screen 800, as shown in FIG. 8. In an exemplary embodiment, invoice review screen 800 includes an invoice document area 802, a commit area 804, and a cancel area 806.

In an exemplary embodiment, invoice document area 802 displays a preview of an invoice document. In an exemplary embodiment, commit area 804 allows for the selection of committing the invoice document to a published invoice document. In an exemplary embodiment, a published invoice document can be viewed by a client. In an exemplary embodiment, cancel area 806 allows for the selection of canceling the invoice document. In an exemplary embodiment, a canceled invoice document cannot be viewed by a client.

CONCLUSION

The present invention relates to auditing software. More particularly, the invention relates to a method and system of managing accounts payable auditing data.

Having fully described a preferred embodiment of the invention and various alternatives, those skilled in the art will recognize, given the teachings herein, that numerous alternatives and equivalents exist which do not depart from the invention. It is therefore intended that the invention not be limited by the foregoing description, but only by the appended claims.

What is claimed is:

1. A computer-implemented method comprising:
   managing accounts payable data of a client, the accounts payable data including at least one line item;
   displaying an aged line item from among the at least one line item, wherein the at least one line item relates to a request from a vendor for payment on an account for the client;
   identifying credit data among the at least one displayed aged line item, wherein the credit data relates to a deduction that the client can take against the requested payment; and
   recording the identified credit data,
   wherein one or more of the managing, displaying, identifying and recording steps are implemented by the computer.

2. The method of claim 1 wherein the aged line item is a line item that has aged for N months, where N is a positive integer.

3. The method of claim 2 wherein N is 4.

4. The method of claim 1 wherein the displaying comprises:
   displaying information about the at least one aged line item, the information including whether the deduction is related to one of an overpayment, a duplicate payment, a rebate, and a return;
   displaying a number of at least one vendor, by rank, that has and has not responded and the status of the at least one vendor; and
   allowing for the noting and aging for follow up of when the vendor promises a fax, a callback, a mailing of an item, or a check request and when the client puts a claim on hold.

5. The method of claim 4 further comprising scheduling an audit of the at least one aged line item.

6. The method of claim 1 wherein the displaying comprises displaying at least one estimate of at least one future claim corresponding to the at least one aged line item.

7. The method of claim 1 wherein the displaying comprises displaying aging information of the at least one aged line item.

8. The method of claim 1 further comprising validating the recorded credit data.

9. The method of claim 8 wherein the validating comprises allowing for the contacting of at least one vendor corresponding to the recorded credit data in order to verify that the at least one aged line item can be submitted for deduction.

10. The method of claim 8 further comprising publishing the validated credit data as claim batch data.

11. The method of claim 10 wherein the claim batch data comprises at least one claim batch document comprising the validated credit data.

12. The method of claim 11 wherein the publishing comprises displaying a preview of the claim batch document.

13. The method of claim 10 wherein the publishing comprises displaying information about at least one batch among the claim batch data.

14. The method of claim 9 further comprising managing the claim batch data.

15. The method of claim 14 wherein the managing comprises allowing for the monitoring of the claim batch data in an interactive manner.

16. The method of claim 14 wherein the managing comprises allowing for the placing on hold at least one claim among the claim batch data.

17. The method of claim 14 wherein the managing comprises displaying at least one status of at least one claim corresponding to the claim batch data.

18. The method of claim 14 wherein the managing comprises displaying at least one type of at least one claim corresponding to the claim batch data.

19. The method of claim 14 further comprising invoicing the managed claim batch data.

20. The method of claim 19 wherein the invoicing comprises producing at least one invoice document for the managed claim batch data.

21. The method of claim 20 wherein the producing comprises displaying a preview of the invoice document.

22. The method of claim 19 wherein the invoicing comprises displaying invoice information about at least one invoice corresponding to the managed claim batch data.

23. The method of claim 1 further comprising:
   validating the recorded credit data;
   publishing the validated credit data as claim batch data;
   managing the claim batch data; and
   invoicing the managed claim batch data.

24. A method according to claim 1, wherein the deduction is related to one of an overpayment made by the client to the vendor, a duplicate payment made by the client to the vendor, a rebate from the vendor to the client, and a return by the client to the vendor.

25. A system of managing accounts payable data of a client, wherein the data comprises at least one line item, the system being implemented by a computer and comprising:
- a displaying unit logically configured to display an aged line item from among the at least one line item, wherein the at least one line item relates to a request from a vendor for payment on an account for the client;
- an identifying unit logically configured to identify credit data among the at least one displayed aged line item, wherein the credit data relates to a deduction that the client can take against the requested payment; and
- a recording unit logically configured to record the identified credit data.

26. A system according to claim 25, wherein the deduction is related to one of an overpayment made by the client to the vendor, a duplicate payment made by the client to the vendor, a rebate from the vendor to the client, and a return by the client to the vendor.

27. A computer-implemented method comprising:
- managing accounts payable data of a client, the accounts payable data including at least one line item, wherein the at least one line item relates to a request from a vendor for payment on an account for the client;
- displaying information about at least one batch among claim batch data corresponding to the at least one line item, wherein the claim batch data relates to a deduction that the client can take against the requested payment; and
- displaying a preview of a claim batch document corresponding to the batch,
- wherein one or more of the steps of managing accounts payable data, displaying information, and displaying a preview are implemented by the computer.

28. A method according to claim 27, wherein the deduction is related to one of an overpayment made by the client to the vendor, a duplicate payment made by the client to the vendor, a rebate from the vendor to the client, and a return by the client to the vendor.

29. A computer-implemented method comprising:
- managing accounts payable data of a client, the accounts payable data including at least one line item, wherein the at least one line item relates to a request from a vendor for payment on an account for the client;
- allowing for the monitoring of claim batch data associated with the at least one line item in an interactive manner, wherein the claim batch data relates to a deduction that the client can take against the requested payment; and
- allowing for the placing on hold at least one claim among the claim batch data,
- wherein one or more of the steps of managing accounts payable data, allowing for the monitoring of claim batch data and allowing for the placing on hold are implemented by the computer.

30. A method according to claim 29, wherein the deduction is related to one of an overpayment made by the client to the vendor, a duplicate payment made by the client to the vendor, a rebate from the vendor to the client, and a return by the client to the vendor.

* * * * *